United States Patent [19]

Nagase et al.

[11] Patent Number: 5,221,340

[45] Date of Patent: Jun. 22, 1993

[54] METHOD FOR PRODUCING ODOR-FREE METALLIC PIGMENT COMPOSITION

[75] Inventors: Fumiaki Nagase; Masakatsu Harada; Takashi Ohkuma; Yasufumi Uemura; Hideji Murabayashi; Hiroo Usami, all of Osaka, Japan

[73] Assignee: Toyo Aluminum Kabushiki Kaisha, Osaka, Japan

[21] Appl. No.: 707,804

[22] Filed: May 30, 1991

[30] Foreign Application Priority Data

May 31, 1990 [JP] Japan .................................. 2-142997
Nov. 20, 1990 [JP] Japan .................................. 2-318851

[51] Int. Cl.⁵ ............................................. C09C 1/62
[52] U.S. Cl. ................................... 106/403; 523/102; 523/340
[58] Field of Search ............... 106/403, 404, 499, 502; 523/102, 340

[56] References Cited

U.S. PATENT DOCUMENTS

| | | | |
|---|---|---|---|
| 3,864,300 | 2/1975 | Robey | 523/102 |
| 4,002,593 | 1/1977 | Jones | 523/340 |
| 4,042,560 | 8/1977 | Peng | 523/340 |
| 4,066,613 | 1/1978 | Peng | 523/340 |
| 4,757,099 | 1/1988 | Hoshino et al. | 523/102 |
| 5,063,256 | 11/1991 | Hoshino et al. | 523/102 |

FOREIGN PATENT DOCUMENTS 0385771 9/1990 European Pat. Off. ............ 523/102

OTHER PUBLICATIONS

Matsuoka et al—Chemical Abstract (Oct. 16, 1990) JP 02255842 "Thermoplastic Resin Compositions with Metallic Luster".

*Primary Examiner*—Mark L. Bell
*Assistant Examiner*—Paul Marcantoni
*Attorney, Agent, or Firm*—Wenderoth, Lind & Ponack

[57] ABSTRACT

In a method for producing an odor-free metallic pigment composition, a metallic pigment is ground by a wet process. The pigment is then mixed into a molten thermoplastic resin to vaporize any additives in the metallic pigment by the heat of the resin. The pigment may be dried until its solid content becomes 50-99 percent by weight before mixing into the molten thermoplastic resin.

2 Claims, No Drawings

METHOD FOR PRODUCING ODOR-FREE METALLIC PIGMENT COMPOSITION

This invention relates to a method for producing a composition containing as a main component a metallic pigment such as aluminum powder.

In grinding various kinds of metals used as metallic pigments, the more finely they are ground, the larger their specific surface area, thus the more active the surface oxidation in the atmosphere. This may expose some metals (such as aluminum) to the danger of igniting or heat build-up. For this reason, the dry process was used for grinding in the past. But recently the wet process is increasingly used.

The wet type grinding is carried out in an oily solvent having a high flash point. As grinding assistants, various kinds of fatty acids and esters, aliphatic amines, and alcohols are used. Especially as for metallic pigments required to be ground finely, they are usually used in a wet condition because they are dangerous even during use. Also, since some of them are accompanied with the odors of solvents and assistants produced during grinding, they are sometimes dried into a powdery state after wet grinding. But since this method is accompanied by considerable danger, it is not commonly employed. Trials have been made to deodorize the solvents used during wet grinding or to use assistants having less odor. But the pigment thus made is unsatisfactory in luster and color and too expensive for use.

Thus, a finely powdered metallic pigment produced by the wet process was heretofore used in a wet state. Since such a pigment contains various kinds of grinding assistants, they have a specific odor which was an obstacle to the increased application of pigments.

It is an object of this invention to provide a method for producing a metallic pigment composition having a reduced degree of odor.

In accordance with the present invention, the metallic pigment ground by a wet process is mixed into a molten thermoplastic resin to vaporize any additives in the metallic pigment by heat of the molten resin to obtain a metallic pigment composition.

In accordance with the present invention, also, after dried to a high solid content, the metallic pigment ground by the wet process is mixed into a molten thermoplastic resin to obtain a metallic pigment composition.

A metallic pigment obtained by the wet process is mixed into a thermoplastic resin melted by heat. The heat of the resin serves to vaporize any additives that remain in the metallic pigment. Also, the thermoplastic resin covers the surface of the metallic pigment particles, thus preventing oxidation and providing surface protection. Further, by drying the metallic pigment prepared by the wet process to have a high solid content beforehand, its odor can be eliminated more effectively.

In the wet process, grinding is done in an oily solvent while adding various kinds of fatty acids, esters and alcohols as grinding assistants. The solid content at the end of grinding will be 20 to 50 percent by weight. The material thus obtained may be directly mixed into a molten thermoplastic resin. But the following process is preferable. Namely, oily solvents are removed from the pigment in a slurry or paste state by means of various drying methods, e.g. by use of a filter press or a vacuum dryer until the solid content increases to 50 to 99 percent by weight. This solid content is the highest value within the permissible range from the viewpoint of safety in handling pigments.

The pigment should preferably be washed beforehand with clean solvent before drying with a filter press or a vacuum dryer.

Next, the metallic pigment is mixed in a molten thermoplastic resin to vaporize the remaining additives. The thermoplastic resin is melted by heat with no solvent and mixed with the metallic pigment by stirring in order to vaporize solvents and assistants. For this purpose, its viscosity when melted by heat should be as low as possible. Its melting point should be as low as possible from the viewpoint of workability. But in order to vaporize solvents and assistants, its temperature has to be high to a certain degree. The resin used has to meet these requirements and further has to be suitable for the application of the metallic pigment. An optimum one has to be selected taking into account these requirements. For example, when using a metallic pigment for a polyethylene film or polypropylene film material used as inexpensive bags, a low molecular weight polyethylene (such as HIWAX made by Mitsui Petrochemical Industries, Ltd., BASF Wax made by BASF AG, SANWAX-P made by Sanyo Kasei Chemical Industries, Ltd.) and a low-molecular weight polypropylene (such as VISCOL made by Sanyo Chemical) are preferable. When used for a metallic paint and a pigment for ink, a hydrogenerated terpene resin (such as CLEARON made by Yasuhara Yushi Kogyo Co., Ltd.) or a cycloaliphatic saturated hydrocarbon (such as ARKON made by Arakawa Kagaku Kogyo K.K.) are preferable.

The mixing ratio of such a thermoplastic resin to the metallic pigment is preferably 20 to 95 percent by weight in terms of the solid content. If the ratio is 95 percent by weight or more, the resin content is excessive and thus not economical. If 20 percent by weight or less, the effect of addition will not be sufficient.

By mixing a metallic pigment into a molten thermoplastic resin and kneading them together under reduced pressure, vaporization of additives is enhanced. This serves to further reduce the odor of the metallic pigment composition.

Residual odors are eliminated from the metallic pigment in the form of paste produced by the conventional wet type grinding process when used for plastic films or various kinds of paints and ink, by adding it to a molten thermoplastic resin. The mixture of the metallic pigment and thermoplastic resin may be taken out by various methods which are convenient for later use. Namely, when forming it into a plastic product, it is preferably formed into pellets. In this case, the step of hardening by cooling from heat-molten state may be carried out by use of a pelletizer. But in order to prevent change in particle size due to re-grinding of the metallic pigment, a roll type extruding pelletizer should be used in which no shearing force is applied even if the pigment is mixed with the molten thermoplastic resin.

As for a pigment used for an ink paint, after the mixture of the pigment having oily additives and assistants removed and the thermoplastic resin has been completed, it can be used without any problem in the form of paste or a dispersion dispersed in an organic solvent such as toluene, xylene, isopropanol or n-butanol which is convenient for later use.

In similar applications, if mixture with an aqueous resin is expected, the aforementioned paste or dispersion can be water-dispersed easily by adding various kinds of emulsifying agents and surface active agents and stirring them together.

The present invention will be further described with reference to the following examples and comparative examples.

EXAMPLE 1

400 grams of HIWAX 420P (average molecular weight: 4000, made by Mitsui Petrochemical) was put in a sealed type vertical double-shaft kneader having a capacity of 2 liters and melted by heating to 120° C. Thereafter, 923 grams of ALPASTE 200M (aluminum content: 65%. stearic acid: 2.5%, remainder: mineral spirit, made by Toyo Aluminium K.K.) was added and kneaded together uniformly. After reducing pressure to 10 mmHg, the material was heated for one and half hours at the same temperature while kneading to vaporize the oily solvents. The composition thus obtained was taken out of the kneader, cooled to normal temperature, and pelletized with a roll type extrusion pelletizer. The pellets contained 60% of aluminum with the residual oily additive (mineral spirit) content being 0.02%.

17 grams of the pellets thus made was blended with 1690 grams of SUMIKATHENE 705 (polyethylene made by Sumitomo Chemical Co., Ltd.) and a film 50 microns thick was formed by the inflation method.

The film contained 0.5% of aluminum with the residual oily additive content being 0.007%. Also, the results of organoleptic examination by experts revealed that the odor specific to aluminum paste was minimum and its color tone was whitish.

COMPARATIVE EXAMPLE 1

620 grams of ALPASTE 200M was added to 600 grams of SUMIKATHENE 705 melted at 180° C. and kneaded together for one hour by the three-roll method, one of the conventional kneading methods. Then the mixture was taken out and cooled to normal temperature. 500 grams of the composition thus made was mixed with 500 grams of SUMIKATHENE 705 and extruded and pelletized. The residual oily additive content of the pellets was 0.05%. 38 grams of the pellets was blended with 1,462 grams of SUMIKATHENE 705 and the mixture was formed into a film 50 microns thick by the inflation method.

The film contained 0.5% of aluminum with the residual oily additive content being 0.015%. It had an odor specific to aluminum paste and its color tone was blackish.

EXAMPLE 2

600 grams of HIWAX 420 P was put in a sealed type vertical double-shaft kneader having a capacity of 2 liters and heated to 120° C. 400 grams of fine particles of titanium dioxide MT-500B (made by TAYCA CORPORATION, specific surface area: 30–50 m²/gram) was added. After kneading for one hour, the material was cooled to normal temperature for pelletizing.

Also, ALPASTE MG1000 (aluminum content 70%, oleic acid: 2%, remainder: mineral spirit, made by Toyo Aluminium K.K.) was used to prepare pellets containing HYWAX 420P in the same manner as in Example 1.

50 grams of the former pellets and 17 grams of the latter pellets were blended with 933 grams of SUMIKATHENE 705 and the mixture was formed into a film 100 microns thick by the inflation method. The film had little odor specific to aluminum paste and its color tone was pearl metallic with the fine particles of titanium dioxide dispersed uniformly.

EXAMPLE 3

400 grams of CLEARON (made by Yasuhara Yushi Kogyo) was melted at 70° C. in the same kneader as used in Example 1 and 923 grams of ALPASTE 230M (aluminum content: 70%, stearic acid: 20%, remainder: mineral spirit, made by Toyo Aluminum K.K.) was added. This material was heated to 100° C. after reducing pressure to 10 mmHg and kneaded for two hours at the same temperature to vaporize the oily additives contained. Then the mixture was cooled and hardened. To the solid mixture thus obtained, 700 grams of xylene was added and kneaded together into a paste state. The mixed paste thus obtained contained 35% of aluminum with the solid content being 58%.

57 grams of the paste was mixed with 100 grams of MEDIUM TF-800 (polyamide-nitrocellulose resin, solid content: 20%, made by Dainippon Ink & Chemical Inc.) to prepare silver ink. The results of organoleptic examination revealed that the ink had little odor specific to aluminum paste.

EXAMPLE 4

400 grams of HIWAX 420 P (average molecular weight: 4000, made by Mitsui Petrochemical) was put in a vertical double-shaft kneader having a capacity of 2 liters and after melting it by heating to 120° C., 923 grams of ALPASTE 200M (aluminum content: 65%, stearic acid: 2.5%, remainder: mineral spirit, made by Toyo Aluminium) was added, and mixed uniformly. The mixture was then heated while kneading for four hours at the same temperature to vaporize its oily additives. The composition thus obtained was taken out of the kneader and cooled to normal temperature. Then it was pelletized with a roll type extrusion pelletizer. The pellets contained 60% of aluminum with the residual solvent (mineral spirit) content being 0.03%.

17 grams of the pellets were blended with 1,690 grams of SUMIKATHENE 705 (polyethylene made by Sumitomo Chemical) and the mixture was formed into a film 50 microns thick by an inflation method.

The film contained 0.5% of aluminum with the residual lubricant content being 0.008%. The results of organoleptic examination by experts revealed that it had little odor specific to aluminum paste and its color tone was whitish.

COMPARATIVE EXAMPLE 2

31 grams of ALPASTE 230T (aluminum content: 70%, stearic acid: 2%, mineral spirit: 5%, remainder: toluene, made by Toyo Aluminium) was mixed with 100 grams of MEDIUM TF-800 to prepare a silver ink. The ink thus obtained had a slight odor specific to aluminum paste.

What is claimed is:

1. A method for producing an odor-free metallic pigment composition comprising the steps of grinding a metallic pigment by a wet process, heating a thermoplastic resin to melt the resin, and kneading under reduced pressure said metallic pigment into the molten thermoplastic resin to vaporize any additives contained in said metallic pigment by the heat of said molten thermoplastic resin.

2. A method as claimed in claim 1, wherein said metallic pigment is dried until its solid content reaches 50–99 percent by weight before it is kneaded under reduced pressure into said molten thermoplastic resin.

* * * * *